(12) United States Patent
Baudelocque (10) Patent No.: US 10,955,001 B2
(45) Date of Patent: Mar. 23, 2021

(54) MAGNETIC BEARING ASSEMBLY

(71) Applicant: SKF Magnetic Mechatronics, Saint-Marcel (FR)

(72) Inventor: Luc Baudelocque, Vernon (FR)

(73) Assignee: SKF Magnetic Mechatronics, Saint-Marcel (FR)

( * ) Notice: Subject to any disclaimer, the term of this patent is extended or adjusted under 35 U.S.C. 154(b) by 17 days.

(21) Appl. No.: 16/214,217

(22) Filed: Dec. 10, 2018

(65) Prior Publication Data

US 2019/0186537 A1     Jun. 20, 2019

(30) Foreign Application Priority Data

Dec. 14, 2017 (EP) ...................................... 17207337

(51) Int. Cl.
*F16C 32/04* (2006.01)

(52) U.S. Cl.
CPC ........ *F16C 32/048* (2013.01); *F16C 32/0461* (2013.01)

(58) Field of Classification Search
CPC ................ F16C 32/048; F16C 32/0461; F16C 32/0482; F16C 32/0493; H02K 7/09
USPC ........................................................ 310/90.5
See application file for complete search history.

(56) References Cited

U.S. PATENT DOCUMENTS

| | | | |
|---|---|---|---|
| 5,398,571 A | 3/1995 | Lewis | |
| 5,543,673 A * | 8/1996 | Katsumata | F16C 32/0444 310/68 B |
| 6,921,997 B2 * | 7/2005 | Chen | F16C 32/0451 310/166 |
| 7,656,135 B2 * | 2/2010 | Schram | F03D 7/02 322/59 |
| 2014/0354098 A1 * | 12/2014 | Krebs | F16C 33/06 310/90.5 |

FOREIGN PATENT DOCUMENTS

| | | | |
|---|---|---|---|
| CN | 101886670 A | 11/2010 | |
| CN | 20192534 U | 8/2011 | |
| EP | 3086096 B1 * | 12/2017 | ............... G01D 5/20 |
| JP | H07301236 A | 11/1995 | |

* cited by examiner

*Primary Examiner* — Burton S Mullins
(74) *Attorney, Agent, or Firm* — Garcia-Zamor Intellectual Property Law; Ruy Garcia-Zamor; Bryan Peckjian (57) ABSTRACT

A radial magnetic bearing assembly having an unsymmetrical stator. The assembly comprises fewer or smaller electromagnets, and thus capacity, in the two lower quadrants below the rotor in use, in comparison to the electromagnets, and thus capacity, in the two upper quadrants above the rotor in use. This creates space in the two lower quadrants that can advantageously be used to move for example instrumentation and cooling from other places of the assembly to make the bearing assembly compactor, and also to be able to put instrumentation and cooling where it is best needed, close to the rotor.

12 Claims, 8 Drawing Sheets

MAGNETIC BEARING ASSEMBLY

CROSS-REFERENCE TO RELATED APPLICATION(S)

This application claims priority to European patent application no. 17207337.1 filed on Dec. 14, 2018, the contents of which are fully incorporated herein by reference.

TECHNICAL FIELD OF THE PRESENT INVENTION

The invention concerns magnetic bearing assemblies and is more particularly directed to improvements to radial magnetic bearings with a substantially horizontal shaft.

BACKGROUND OF THE PRESENT INVENTION

Magnetic bearings can be integrated with rotating apparatuses, such as flywheels, turbo molecular pumps, turbo expanders, turbo compressors, air blowers, spindles, chillers, etc. For instance, flywheels are designed to store rotational energy. Flywheels equipped with conventional bearings are limited to a revolution rate of a few thousand RPM (revolutions per minute), while flywheels equipped with magnetic bearings can reach up to hundred thousand RPM. Magnetic bearings can be used to support and position rotating machinery for applications requiring one or more of low mechanical wear, no lubrication, relatively high rotational speeds, operation in harsh environments, and/or relatively low frictional losses.

A magnetic bearing comprises a rotor and a stator. The rotor is coupled with a shaft of a rotating machine that the magnetic bearing is to support. The stator structure of a radial magnetic bearing is commonly made of four quadrants equally distributed in 90° sectors around the rotor, each sector having the same shape and characteristic. Two are located on the top of the bearing and two are located at the bottom of the bearing. Each sector is characterized by its force capability similar in all four quadrants. Each quadrant is fed by one or more current power amplifiers characterized by their supply voltage and their maximum current.

In addition, a radial magnetic bearing will have sensors and auxiliary bearings. The sensors are position sensors and also in most applications rotation speed and temperature sensors. The position sensors measure the position of the rotor/shaft, which measurements are used in a control loop to make sure that the rotor/shaft is in the correct position. The auxiliary bearing(s) support the rotor/shaft when the magnetic bearing is either powered down or has failed.

The sensors and the auxiliary bearings have to be located next to the stator along the rotor/shaft making the extension of the magnetic bearing along the shaft quite extensive. There is still room for improvements.

SUMMARY OF THE PRESENT INVENTION

An object of the invention is to define an improved radial magnetic bearing.

The aforementioned object is a radial magnetic bearing assembly having an unsymmetrical stator achieved according to the invention. The assembly comprises fewer or smaller electromagnets, and thus capacity, in the two lower quadrants also referred to as the first and second lower quadrant in the specification and claims) below the rotor in use, in comparison to the electromagnets, and thus capacity, in the upper quadrants (also referred to as first and second upper quadrants in the specification and the claims) above the rotor in use. This creates space in the two lower quadrants that can advantageously be used to move, for example, instrumentation and cooling from other places of the assembly to make the bearing assembly more compact, and also to put instrumentation and cooling where it is best needed, close to the rotor.

The aforementioned object is also achieved according to the invention by a radial magnetic bearing comprising a rotor and a stator. The bearing is divided into four quadrants, two upper quadrants (also referred to as first and second upper quadrants in the specification and the claims) located above the rotor opposite the direction of gravity when in use and first and second lower quadrants located below the rotor in the direction of gravity, towards the earth, when in use. The extension of the rotor is substantially perpendicular to the direction of gravity when in use. According to the invention the stator comprises electromagnets in the two upper quadrants that have upper joint stator electromagnetic force capacity larger than the gravitational force on the rotor. Also, static gravity is used as a static capacity in the two lower quadrants. A joint stator electromagnetic force capacity in the two lower quadrants is less than the joint stator electromagnetic force capacity in the two upper quadrants. This means any area of the stator used by electromagnets in the first and second upper quadrants is preferably, but not necessarily, substantially the same size as any area of the stator used by electromagnets in the two lower quadrants plus an available area along the stator/rotor without electromagnets in the two lower quadrants. This is due to that the maximum force of a magnetic bearing is roughly given by its stator surface. There is thus the available area, or areas if seen as separate pieces and not only total size, around the rotor in the two lower quadrants. Additional elements of the magnetic bearing apparatus can be placed in the available area of the lower quadrants. This would make the bearing more compact. Elements advantageous to the rotor can be placed here. The rotor becomes much easier to access by coolers, instrumentation, etc. that should be in close proximity to the rotor.

Advantageously the upper joint stator electromagnetic force capacity minus the gravitational force on the rotor at the bearing is greater than the lower joint stator electromagnetic force capacity.

In some embodiments of the invention the stator comprises electromagnets in the two lower quadrants. In these embodiments the lower joint stator electromagnetic force capacity in the due to the electromagnets is less than 50% of the upper joint stator electromagnetic force capacity due to the electromagnets in the two lower quadrants. The gravitational force is taken into account, thus requiring fewer or smaller, electromagnets in the two lower quadrants.

Advantageously the joint stator electromagnetic force capacity in the two lower quadrants is approximately or equal to 30% of the joint stator electromagnetic force capacity in the two upper quadrants due to electromagnets. The electromagnets will then only need to occupy about a third of the area of the two lower quadrants, thus about two thirds will be available area in the two lower quadrants.

In other embodiments of the present invention, the radial magnetic bearing only comprises electromagnets in the first and second upper quadrants. That is the bearing has no electromagnets or is considered to be exclusive of electromagnets in the first and second lower quadrants and the bearing is only using the gravitational force for the two lower quadrants for creating a down force towards earth.

The result of this is that the available area along the stator/rotor in the two lower quadrants is substantially the same size as the area of the stator used by electromagnets in the two upper quadrants. In principle the two lower quadrants along the stator/rotor are available for instrumentation, auxiliary bearing(s), and other things.

In further embodiments there are in each of the first and second upper quadrants at least two independent circuits of electromagnets that are fed by one individual current power amplifier. Each of the power amplifiers delivers the same current to each of the independent circuits of electromagnets within same quadrant. Further advantages can be attained by having the upper quadrants comprising two or more power amplifiers per quadrant. Each power amplifier feeds one independent circuit of electromagnets thereby decreasing the inductance seen by each power amplifier to thereby increase a dynamic capability and/or an increased power amplifier failure tolerance of the bearing.

Advantageously the available area in the two lower quadrants is at least in part used for instrumentation. Instrumentation comprises one or more of a position sensor, a vibration sensor, a rotor temperature sensor, a speed sensor. In some embodiments the available area in the two lower quadrants is at least in part used to place one or more auxiliary landing bearings. In addition the available area in the two lower quadrants can also at least in part be used to place a mechanical support in case of failure of the magnetic bearing. Advantageously the available area in the two lower quadrants is also at least in part used to place a cooling system for the rotor.

The different additional enhancements of the radial magnetic bearing assembly according to the invention described above can be combined in any desired manner as long as no conflicting features are combined.

This invention is adapting the capacity of the two lower quadrants to what is necessary when the gravitational force is taken into account, allowing a saving of significant space that can be used to place other functions that were previously placed elsewhere and gives opportunity to improve the cooling efficiency.

Other advantages of this invention will become apparent from the detailed description.

BRIEF DESCRIPTION OF THE DRAWINGS

The invention will now be described in more detail for explanatory, and in no sense limiting, purposes, with reference to the following figures, in which.

DETAILED DESCRIPTION OF THE PRESENT INVENTION

In order to clarify the method and device according to the invention, some examples of its use will now be described in connection with FIGS. 1 to 8.

Figure 1:
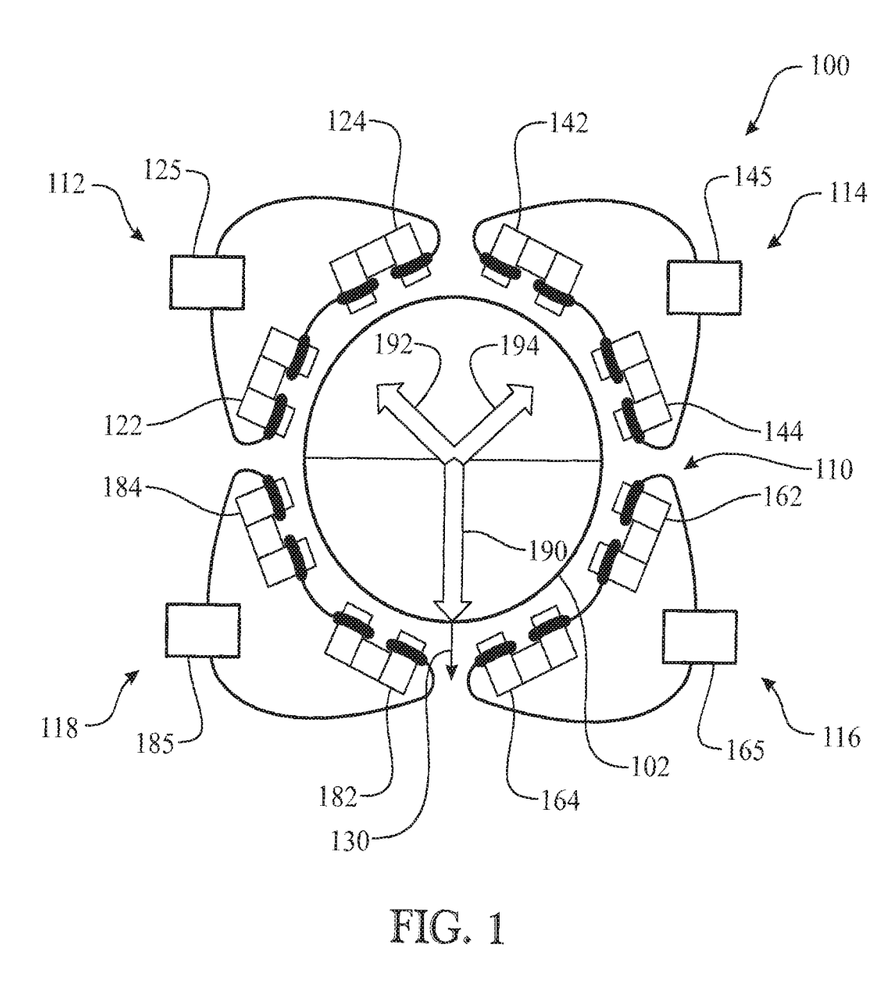
FIG. 1 presents a cross section elevation view of a magnetic bearing, wherein the section is taken across a rotor of the magnetic bearing.

FIG. 1 illustrates a cross section across a rotational axis of a radial magnetic bearing 100 with a rotor 102 and a stator 110. The stator is divided into four quadrants 112, 114, 116, 118, including first and second upper quadrants 112, 114 that are located above the rotor 102 in a direction that is opposite to a direction of gravity 130 when in use and first and second lower quadrants 116, 118 that are located below the rotor 102 in the direction of gravity (towards the earth) when in use. Each quadrant 112, 114, 116, 118 comprises electromagnets 122, 124, 142, 144, 162, 164, 182, 184, here illustrated as two in each quadrant 112, 114, 116, 118, that are controlled by at least one power amplifier 125, 145, 165, 185 per quadrant 112, 114, 116, 118.

The gravitational force 190 at the radial magnetic bearing is W, each first and second upper quadrant then needs to deliver a force of W/√2 192, 194 so that the combined upwards vertical force is equal to W (vertical projection of two 45° axes), the gravitational force to keep the rotor in equilibrium.

Figure 2:
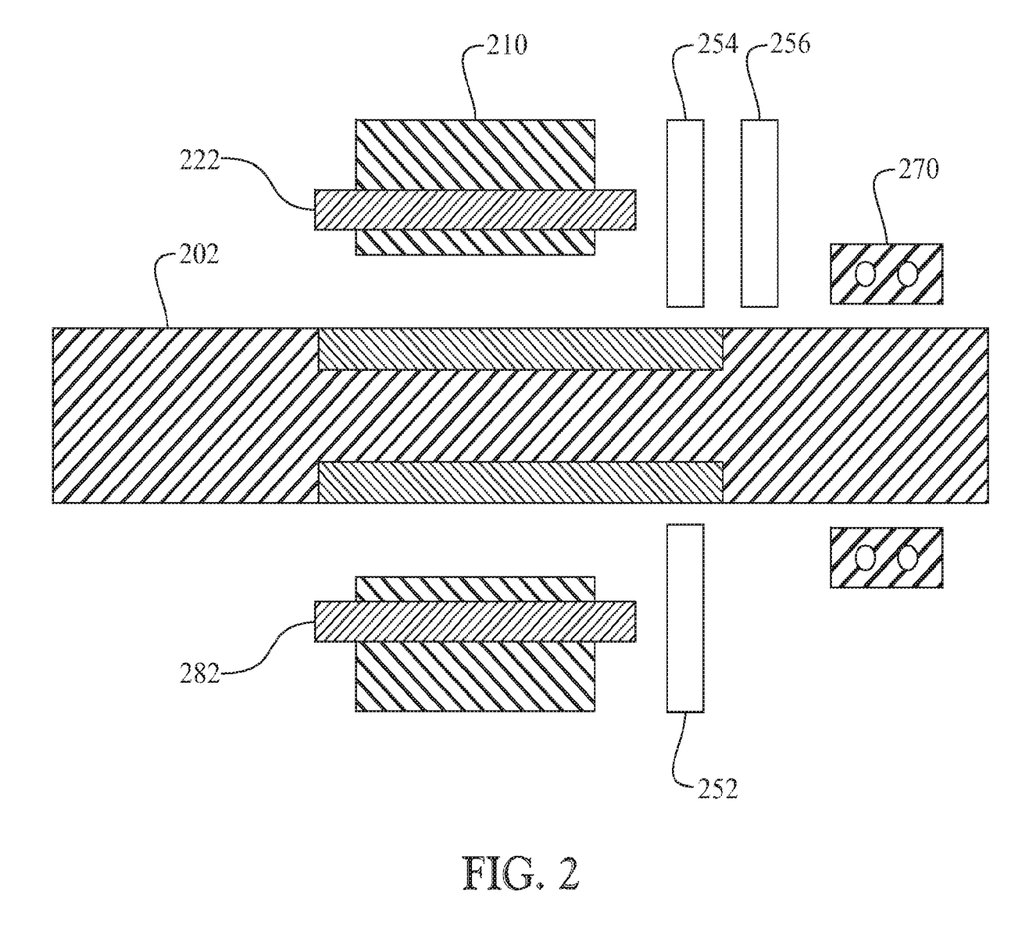
FIG. 2 presents a cross section elevation view of the magnetic bearing originally introduced in FIG. 1, wherein the section is taken along the rotor of the magnetic bearing.

FIG. 2 illustrates a side cross section along a rotational axis of a radial magnetic bearing according to FIG. 1, rotor 202, stator 210 and electromagnets 222, 282. Also illustrated here are the sensors 252, 254, 256 and auxiliary bearing(s) 270 that are needed. As can be seen in FIG. 2 (not to scale), the extension along its axis of rotation is quite large and with that the disadvantages it brings of having both the sensors and auxiliary bearing(s) along the shaft. For example, the position of the shaft where the position sensors measure the position is not necessarily the same position of the rotor within the bearing.

Figure 3:
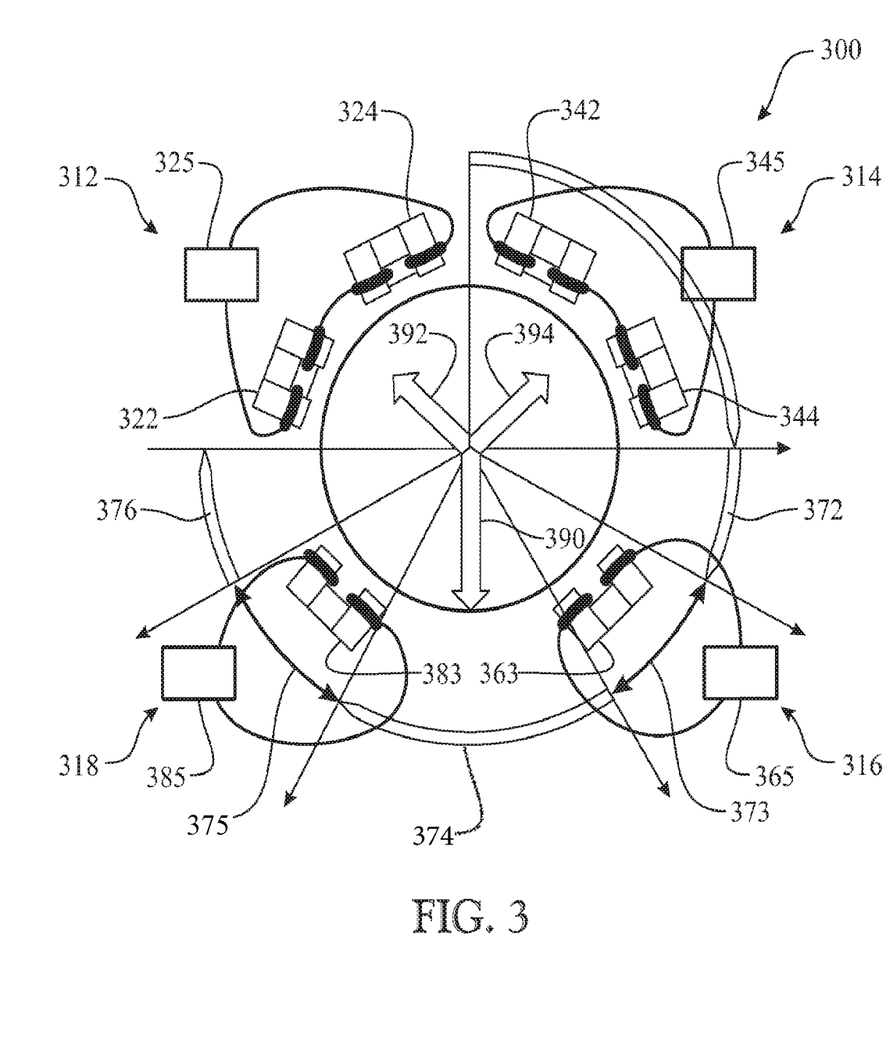
FIG. 3 presents a basic principle of the invention by a cross section of a first embodiment of a radial magnetic bearing according to the invention, across the rotor of the magnetic bearing.

FIG. 3 illustrates a basic principle of the invention by a cross section of a first embodiment of a radial magnetic bearing according to the invention, across its rotor. Here it can be seen that the stator is unsymmetrical with regard to the electro magnets 322, 324, 342, 344, 363, 383, there being fewer, or smaller or less powerful electro magnets in the two lower quadrants 316, 318 in comparison to the first and second upper quadrants 312, 314. This is made possible by accounting for gravity as a permanent force of the magnetic bearing.

The standard rule of design for a magnetic bearing machine is to have a four quadrant radial bearing with a load capacity equal to at least 2 times, commonly 3 times for super-critical machine, the weight of the rotor at the magnetic bearing. The possibility of the invention of using gravity as a permanent force will in this example be described for a 3 times ratio.

We assume that the vertical gravity load at the radial bearing is W 390. Each quadrant is designed to be able to deliver a maximum force (capacity of the magnetic bearing) of 3*W/2 so that the maximum vertical force is equal to 3 W (vertical projection of two 45° axes). In this configuration, each of the upper quadrants 312, 314 can deliver at its maximum a force of 3*W/2. Each upper quadrant is loaded with a gravity force of W/2 392, 394. The maximum dynamic force (usable force) that each upper quadrant is able to produce is 3*W/2−W/2=2 W/2. The maximum force that must be delivered by each of the upper quadrants is the gravitational force plus the needed maximum dynamic force. Meanwhile, the two lower quadrants 316, 318 only need to deliver a maximum force equal to the needed maximum dynamic force minus the gravitational force. The required maximum force of each upper quadrant is then W/2+2 W/2=3 W/2 and the required maximum force of each lower quadrant is then −(W/2−2 W/2)=W/2. That is to say that each of the two lower quadrants need electro magnets 363, 383 with a maximum force that is three times smaller than the maximum force of the electro magnets 322, 324, 342, 344 of each of the two upper quadrants. As the maximum force of a magnetic bearing is roughly given by its stator surface, the magnetic pole area of each of the lower quadrants can be one third of the magnetic pole area of each of the upper quadrants. Thus only 30° 373, 375 of each of the bottom quadrants is needed for magnetic pole area, leaving a total of 120° 372, 374, 376 in the two lower quadrants 316, 318 for other use.

As can be seen by the calculations mentioned above, this embodiment according to the invention illustrated in FIG. 3 does not jeopardize the static capacity of the system or its dynamic capacity, it can always create the same static force and the same modulation.

The only restriction of the invention is that the stator is not symmetrical and thus has to be positioned such that when in use the upper quadrants are on the upper side and thus the lower quadrants are on the bottom side of the rotor of the magnetic bearing. When in use the quadrants of the magnetic bearing must be located such that the directional vector of gravity goes between/divides the two upper quadrants and likewise between/divides the two lower quadrants.

The advantages given by this new configuration are significant, space that is not needed for the electromagnets can advantageously be used to place position sensors, auxiliary bearing(s), speed sensor(s), cooling and more. Even the use of an IR rotor temperature probe looking at the rotor becomes possible and allows measuring the temperature at the hottest part of the magnetic bearing (see for examples FIGS. 5 and 6).

Figure 4:
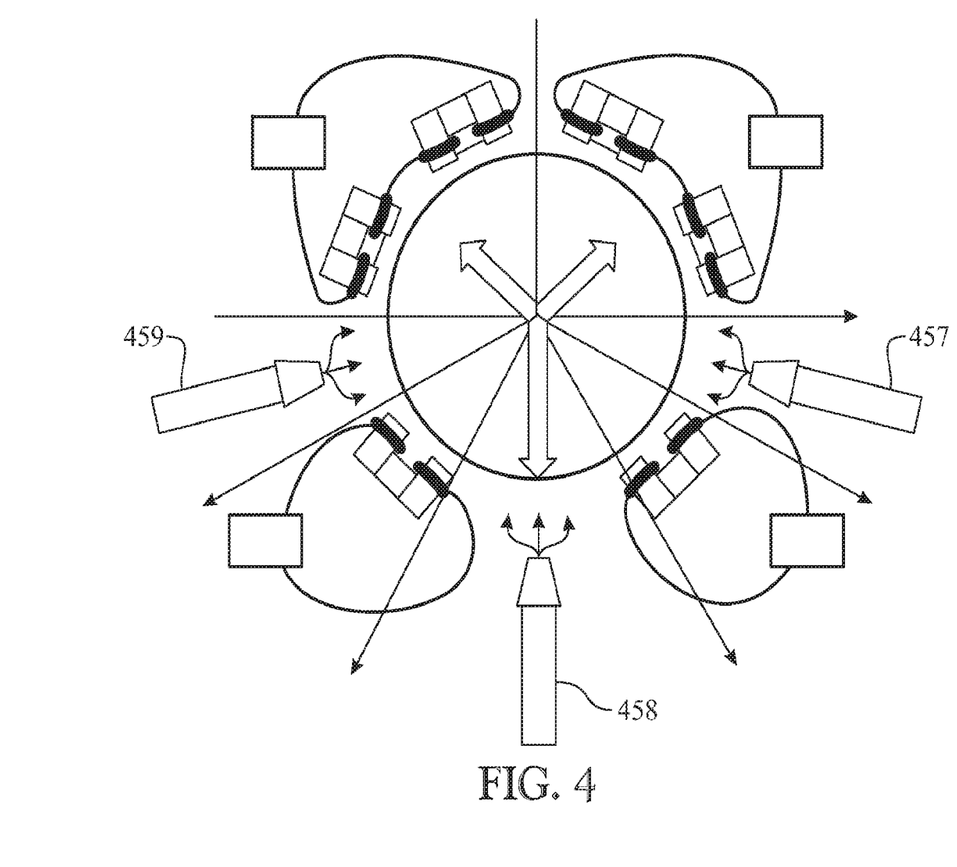
FIG. 4 presents an example of a use of space created around a stator of a radial magnetic bearing according to the first embodiment of the invention, at, for example, a first location along the rotor axis.

FIG. 4 illustrates an example of a use of space created around a stator of a radial magnetic bearing according to the first embodiment of the invention, at for example a first location along its rotor axis. In this example, three coolers 457, 458, 459 are added in the available spaces in the two lower quadrants. It is a great benefit of this invention to enable efficient cooling of the rotor directly where the rotor losses are created.

To be able to efficiently cool a rotor directly is particularly advantageous when the rotor is running at a critical speed. In situations like this the damping synchronous force created by the magnetic bearing is at the same angular location of the rotor, creating uneven losses and subsequently uneven temperature distribution around the rotor that may create thermal unbalance. When an efficient cooling is directly applied on the rotor, thermal unbalances can be avoided or at least reduced. This is particularly advantageous when the rotor laminations are, for corrosion aspect, made of stainless steel like AISI 444 or 17-4PH. These materials have a large magnetic hysteresis cycle and the losses are very high compared with standard lamination (made of iron silicon). The application of direct cooling on the rotor lamination significantly eases the cooling efficiency. The cooling system can either be gas injection or liquid injection or any kind of cooling flow.

Figure 5:
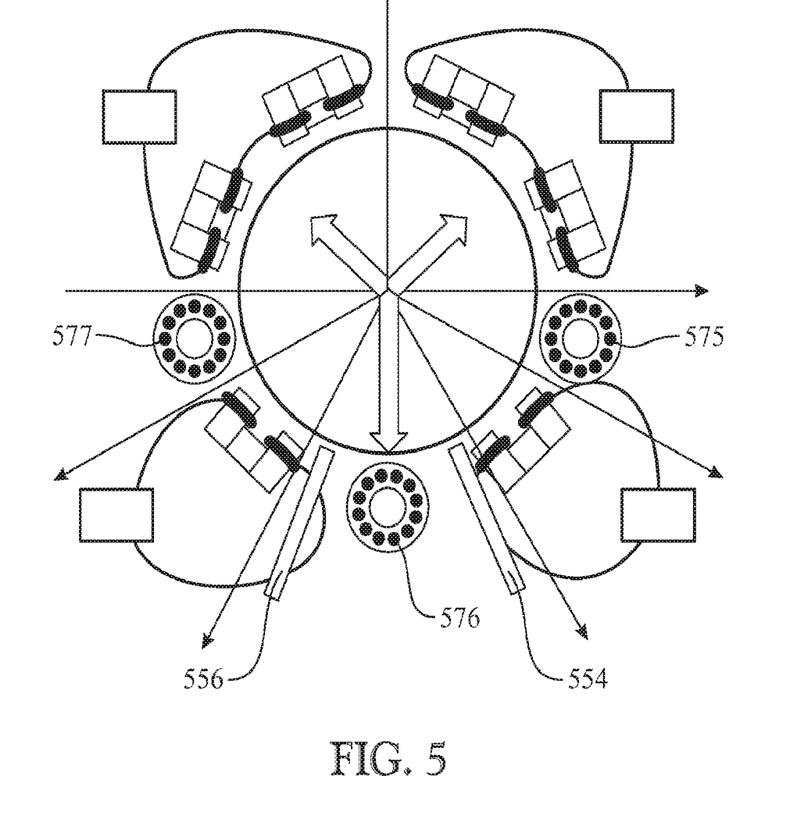
FIG. 5 presents an example of a use of space created around the stator of the radial magnetic bearing according to the first embodiment of the invention, at for example a second location along the rotor axis.

FIG. 5 illustrates a further example of a use of space created around a stator of a radial magnetic bearing according to the first embodiment of the invention, at for example a second location along its rotor axis. In this example, several sensors 554, 556 and auxiliary bearings 575, 576, 577 are using space in the two lower quadrants that is not being used by electro magnets of the two lower quadrants.

It can be noted that position sensors can now be placed at the force center of the bearing avoiding the non-co-location of the bearing with its position sensor, significantly easing the magnetic bearing controller design. As mentioned, use of IR rotor temperature probe looking at the rotor becomes possible and allows measuring temperature at the hottest part of the magnetic bearing, and not along a shaft.

By placing auxiliary bearings here enables giving support to the rotor/shaft when the magnetic bearing is turned off or defective at the same place along the rotor as when the magnetic bearing is active.

Figure 6:
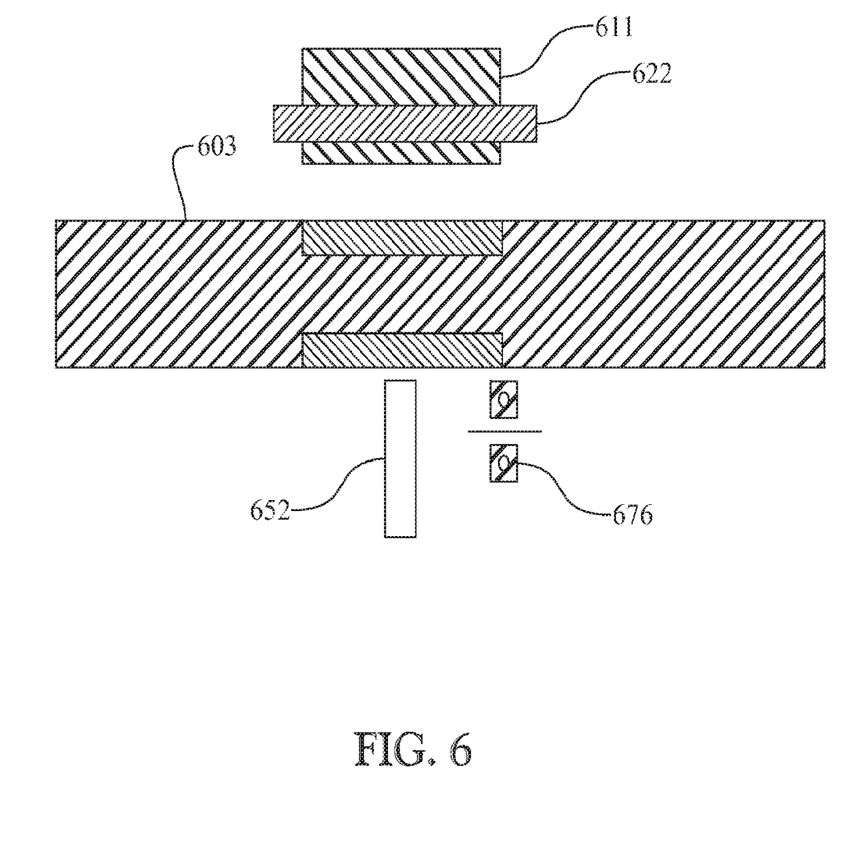
FIG. 6 presents a cross section of the radial magnetic bearing according to FIGS. 4 and 5, wherein the section is taken along the rotor of the magnetic bearing.

FIG. 6 illustrates a cross section of a radial magnetic bearing according to FIGS. 4 and 5, along its rotor. FIGS. 4, 5 and 6 represent a possible arrangement of utilizing available space around the stator of a radial magnetic bearing according to the invention.

In a further example, in case the required bearing capacity is only 2 times or less than the weight of the gravity load, the electro magnets of the two lower quadrants can be completely removed, potentially creating 180° of available space. In this case, the power amplifiers from the two lower quadrants can be used in parallel for the electro magnets of the two upper quadrants, increasing the bearing bandwidth. Each of the upper quadrants can advantageously even have more than two power amplifiers. Alternatively, the power amplifiers of the two lower quadrants can be removed/not used, thus using only one power amplifier per quadrant.

To get a better understanding how this is possible, we go slightly back and again reference FIG. 1, where a standard configuration of a radial magnetic bearing is shown. For the best dynamic capacity it is common in such a standard configuration to work in class A configuration, that is to say that a bias current equal to half of the maximum current is used and facing quadrants are working in push-pull configuration, the first quadrant 112 and the third quadrant 116, and also the second quadrant 114 and the fourth quadrant 118.

If we only consider one 45° axis (for example the first quadrant 112 and the third quadrant 116) the force F of a magnetic bearing is quadratic versus the current I and for a given geometry, we can write $F = K \times F$. We divide this up into the individual quadrants and have:

F1 is the force delivered by the upper quadrant. F2 is the force delivered by the lower quadrant.

I1 is the current flowing in the electromagnets of the upper quadrant. I2 is the current flowing in the electromagnets of the lower quadrant. IM is the maximum current the power amplifiers are able to deliver. FJVI is the maximum force delivered by a quadrant with a current IM. U is the feeding voltage of the power amplifiers.

We can calculate K as $FM=K*IM^2$, $K=FM/IM^2$

Working around a bias current equal to half the maximum current, for a current variation of $\Delta$ that cannot exceed $IM/\sqrt{2}$ (otherwise maximum current of the amplifier is reached)

$$F1=K*(IM/2+\Delta)^2$$

$$F2=K*(IM/2-\Delta)^2$$

$$F1-F2=4*K*IM/2*\Delta=2*K*IM*\Delta=2*FM/IM*$$

And when $\Delta=IM/2$, the maximum force is obtained.

Under normal operation, the bearing is loaded by the gravity and $F1-F2=W/12$ and we can write $$F1-F2=W/\sqrt{2}=2*FM/IM*\Delta=2*(\sqrt{2}*W)/IM*\Delta$$

Gives $\Delta=IM/4$ and $I1=3*IM/4=0.75*IM$

The remaining available current is therefore $IM/2-IM/4=IM/4$ that corresponds to the remaining available force $(\sqrt{2}*W-W/\sqrt{2})=W/\sqrt{2}$ The electromagnets of a quadrant has an inductance value of Lc, the current modulation will create a voltage across this inductance that must not exceed the feeding voltage U. Therefore the maximum frequency up to which the remaining force can be modulated can be written:

$$fa=1/2\pi*U/(Lc*IM/4)$$

Note that due to the class A configuration, if the force is sinusoidal, the current is sinusoidal.

Figure 7:
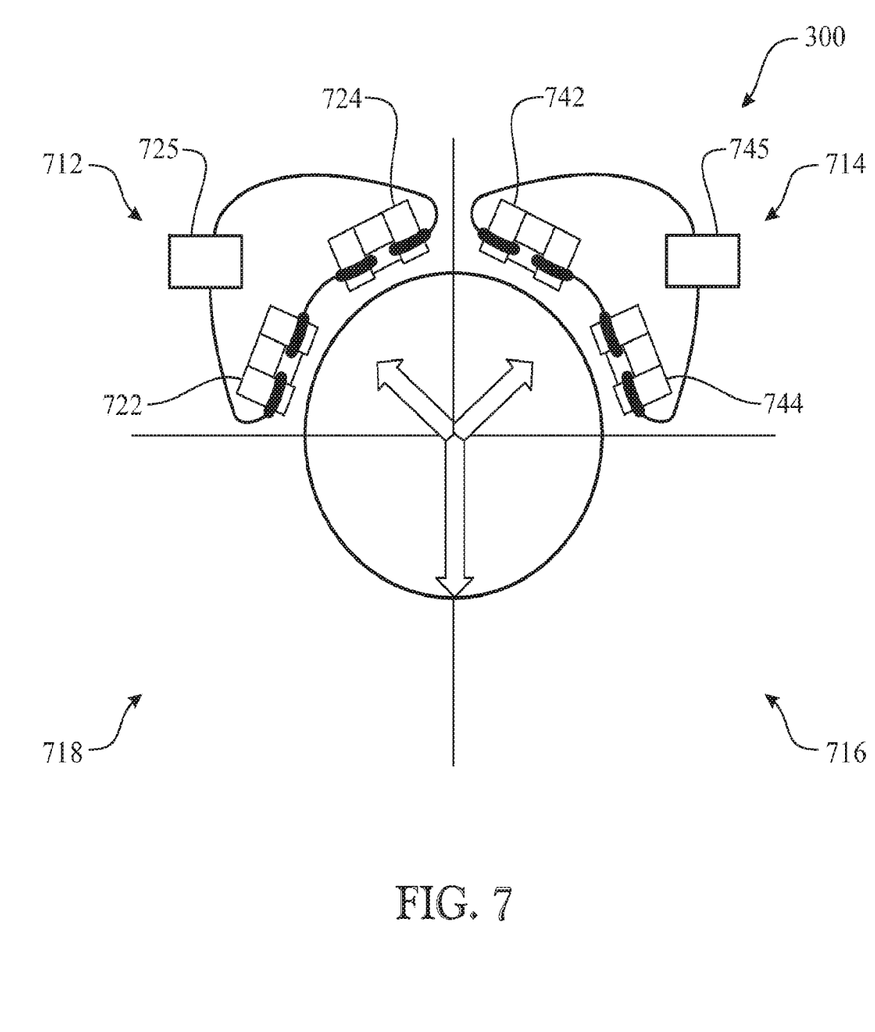
FIG. 7 presents an example of the invention by a cross section of a second embodiment of a radial magnetic bearing according to the invention, wherein the section is taken across the rotor of the magnetic bearing.

Now with reference to FIG. 7, in a class B configuration according to the invention in a further embodiment, with one power amplifier 725, 745 and corresponding electromagnets 722, 724, 742, 744 in each upper quadrant 712, 714, and nothing in the two lower quadrants 716, 718. This gives a total of 180 degrees of available space, both lower quadrants.

Having nothing in the two lower quadrants we get:

$$F1=K*(I1)^2=FIVI/IM^2*(I1)^2$$

F2 does not exist.

Under normal operation, each upper quadrant of the bearing is loaded by gravity and then FI needs to be $FI=W1 \ldots J2$ and we thus get:

$$FM/IM^2*(I1)^2=((\sqrt{w})/IM^2)*(I1)^2=W/\sqrt{2}$$

and $I1=IM\sqrt{2}=0.7*IM$

The remaining available force is always the same $(-\sqrt{2}*W-W/\sqrt{2})=W\sqrt{2}$, but to modulate this remaining force, the current is not anymore sinusoidal and will go up to full current then down to zero, approaching a square wave. The maximum voltage across the inductance is then driven by the above calculated 11. Therefore, the maximum frequency up to which the remaining force can be modulated can be written:

$$tb=1/2\pi*U/(Lc*IM/\sqrt{2})$$

To compare both frequencies, $$tb/fa=\{1/2\pi*U/(Lc*IM/\sqrt{2})\}I\{1/2\pi*U/(Lc*IM/4)\}=1/2\sqrt{2}=0.35$$

Figure 8:
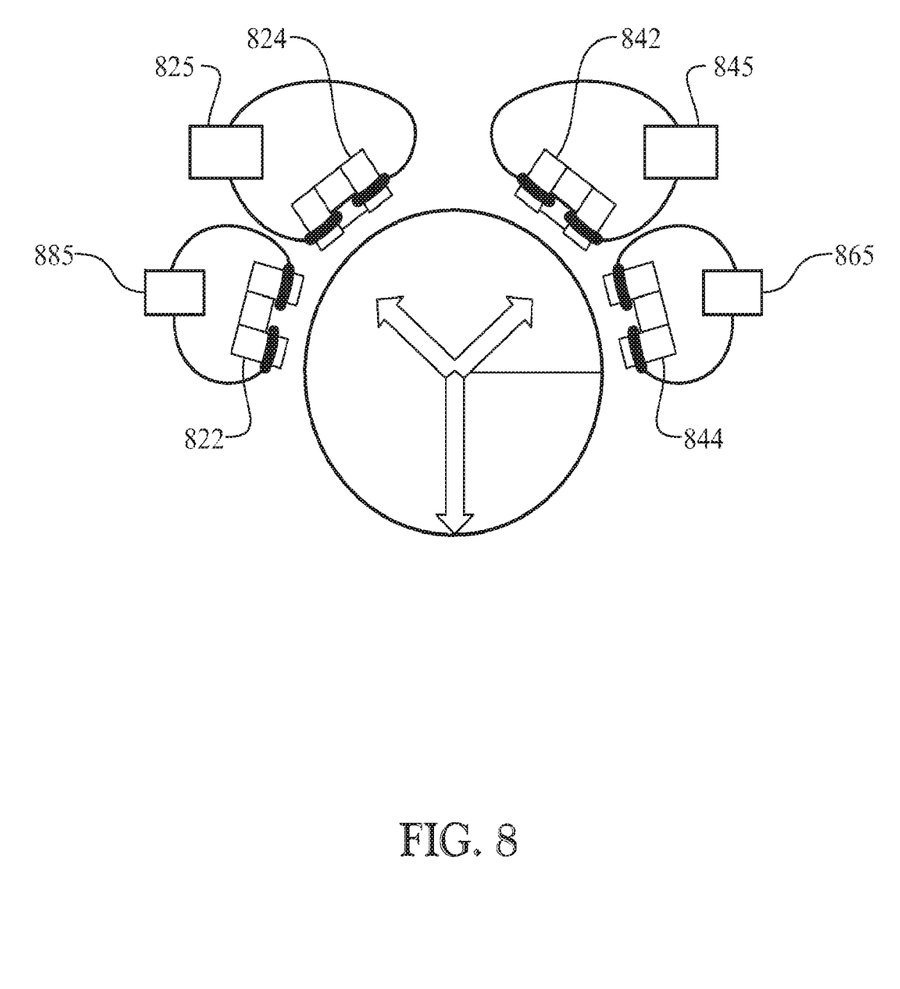
FIG. 8 presents an example of the invention by a cross section of a third embodiment of a radial magnetic bearing according to the invention, wherein the section is taken across the rotor of the magnetic bearing.

FIG. 8 illustrates an example of the invention by a cross section of a still further embodiment of a radial magnetic bearing according to the invention, across its rotor. In the embodiment the radial magnetic bearing is in a class B configuration, with two power amplifiers 885, 825, 845, 865 per upper quadrant, and nothing in the lower quadrants. In this case, the power amplifiers from the two lower quadrants can be used in parallel for the electromagnets 822, 824, 842, 844 of the two upper quadrants, increasing the bearing bandwidth.

The same calculation applies but as the magnetic circuit is shared in two identical parts and each of the power amplifiers is seeing an inductance Lb half of the class A inductance Le.

To compare both frequencies, $$fc/fa=\{1/2\pi*U/(Lc*IM/2\sqrt{2})\}/\{1/2\pi*U/(Lc*IM/4)\}=1/\sqrt{2}=0.7$$

Each of the upper quadrants can advantageously have even more than two power amplifiers per upper quadrant. For example if the concept is extended to 3 power amplifiers per upper quadrant the inductance each power amplifier sees would be Lc/3.

Dynamic calculations have been done on a 46 JVIW compressor, running 4200 rpm m super critical conditions. The aim is to have the maximum margin versus API 617 (American Petroleum Institute standard dealing with Axial and Centrifugal Compressor and Expander-compressor for Petroleum, Chemical and Gas Industry Services) regulation that requests to be able to handle at least 2 (new revision) to 4 times (old revision) the API unbalance. Most of the time and as for this example, the force requested by the bearing is less than the gravity load and the proposed configuration according to the invention is even further beneficial.

Under one time API unbalance, (API 617) it has been calculated that the maximum force to modulate at 4200 rpm was 1750 N. To compare the benefit between all configurations, the maximum number of time API unbalance the bearing can handle before reaching the saturation voltage (300V) of the power amplifiers is tabulated.

The B class with 4 amplifiers (2 per quadrant) as per FIG. 8 is able to handle 23% more unbalance than the A class with 4 amplifiers as per FIG. 1.

We can see that the best configuration is given by the proposed arrangement according to FIG. 8 with an unbalance margin increase by 24%.

|  | Class B (2 amps) | Class B2 (4 amps) | Class A (4 amps) |  |
| --- | --- | --- | --- | --- |
| N API | 4.32 | 8.07 | 6.50 |  |
| Rotor mass | 9500 | 9500 | 9500 | kg |
| Bearing inductance | 0.264 | 0.264 | 0.264 | H |
| API unbalance force | 1750 | 1750 | 1750 | N |
| MCS | 4200 | 4200 | 4200 | rpm |
| Fmax | 65899 | 65899 | 65899 | N |
| Imax | 30 | 30 | 30 | A |
| Fbal | 7560 | 14123 | 11375 | N |
| Static load | 32949 | 32949 | 32949 | N |
| I1 nominal | 21.2 | 21.2 | 22.5 | A |
| I1 max under unbalance | 23.5 | 25.4 | 25.1 | A |
| I1 min under unbalance | 18.6 | 16.0 | 10.1 | A |
| Quadratic sum of current (no unbalance) | 900 | 900 | 1125 | $A^2$ |
| Nampli/Quadrant | 1 | 2 | 1 |  |
| Total number of amplifiers | 2 | 4 | 4 |  |
| Calculated voltage | 300 | 300 | 300 | V |

There is also an improvement in losses. Rotor losses are barely proportional to the forces applied around the bearing by the four quadrants, i.e. to the quadratic sum of the currents; we can see a reduction of the rotor losses by 25%. The stator losses are mainly ohmic losses. They are also proportional to the square of the current per quadrant. There is therefore also a benefit of 25%. In addition, manufacturing costs are reduced as there are fewer electromagnets needed and there might be no need to install stator lamination.

All embodiments according to the invention have a number of advantages over traditional radial magnetic bearings by the space made available in the two lower quadrants. The free space given by the removed parts of the bearing may be used for other purpose like cooling, draining, junction boxes installation, interconnection location, easy access for inspection, sensors and more, improving the compactness and the maintainability of the magnetic bearing.

The invention is based on the basic inventive idea of taking into account gravity as a permanent force that is usable for magnetic bearings, thus being able to create a more compact magnetic bearing including sensors and auxiliary bearing(s). The invention is not restricted to the above-described embodiments, but may be varied within the scope of the following claims.\

FIG. 1 illustrates a cross section of a magnetic bearing, across its rotor:
- 100 Radial magnetic bearing
- 102 Rotor
- 110 Stator
- 112 First quadrant, an Upper quadrant,
- 114 Second quadrant an Upper quadrant,
- 116 Third quadrant a Lower quadrant,
- 118 Fourth quadrant a Lower quadrant,
- 122 First electromagnet of the first quadrant
- 124 Second electromagnet of the first quadrant
- 125 Power amplifier
- 130 Direction of gravity
- 142 First electromagnet of the second quadrant
- 144 Second electromagnet of the second quadrant
- 145 Power amplifier
- 162 First electromagnet of the third quadrant
- 164 Second electromagnet of the third quadrant
- 165 Power amplifier
- 182 First electromagnet of the fourth quadrant
- 184 Second electromagnet of the fourth quadrant
- 185 Power amplifier
- 190 W, vertical static gravity load of the rotor at the radial magnetic bearing
- 192 $W/\sqrt{2}$ force needed from first quadrant so that the upper quadrants total equal W
- 194 $W/\sqrt{2}$ force needed from second quadrant so that the upper quadrants total equal W FIG. 2 illustrates a cross section of a magnetic bearing according to FIG. 1, along its rotor:
- 202 Rotor
- 210 Stator
- 222 Electromagnet of an upper quadrant
- 252 Position sensor
- 254 Position sensor
- 256 Sensor
- 270 Auxiliary bearing
- 282 Electromagnet of a lower quadrant FIG. 3 illustrates a basic principle of the invention by a cross section of a first embodiment of a radial magnetic bearing according to the invention, across its rotor:
- 312 First quadrant, Upper quadrant
- 314 Second quadrant, Upper quadrant
- 316 Third quadrant, Lower quadrant
- 318 Fourth quadrant, Lower quadrant
- 322 First electromagnet of the first quadrant
- 324 Second electromagnet of the first quadrant
- 325 Power amplifier
- 342 First electromagnet of the second quadrant,
- 344 Second electromagnet of the second quadrant
- 345 Power amplifier
- 363 Electromagnet of the third quadrant
- 365 Power amplifier
- 370 A 90 degree sector, a full quadrant,
- 372 A 30 degree available sector of the third quadrant
- 373 A 30 degree sector used by the electromagnet of the third quadrant
- 374 A 60 degree available sector in part in both the third and the fourth quadrants
- 375 A 30 degree sector used by the electromagnet of the fourth quadrant
- 376 A 30 degree available sector of the fourth quadrant
- 383 Electromagnet of the fourth quadrant
- 385 Power amplifier
- 390 W, vertical static gravity load of the rotor at the radial magnetic bearing
- 392 $W/\sqrt{2}$ force needed from first quadrant so that the upper quadrants total equal W
- 394 $W/\sqrt{2}$ force needed from second quadrant so that the upper quadrants total equal W FIG. 4 illustrates an example of a use of space created around a stator of a radial magnetic bearing according to the first embodiment of the invention, at for example a first location along its rotor axis:
- 457 First cooler
- 458 Second cooler
- 459 Third cooler FIG. 5 illustrates an example of a use of space created around a stator of a radial magnetic bearing according to the first embodiment of the invention, at for example a second location along its rotor axis:
- 554 First sensor
- 556 Second sensor
- 575 First mini auxiliary bearing
- 576 Second mini auxiliary bearing
- 577 Third mini auxiliary bearing FIG. 6 illustrates a cross section of a radial magnetic bearing according to FIGS. 4 and 5, along its rotor:
- 603 Rotor/Shaft
- 611 Stator
- 622 Electromagnet of an upper quadrant
- 652 Sensor/Cooler/ . . .
- 676 One mini auxiliary bearing FIG. 7 illustrates an example of the invention by a cross section of a second embodiment of a radial magnetic bearing according to the invention, across its rotor:
- 712 First quadrant, an upper quadrant
- 714 Second quadrant, an upper quadrant
- 716 Third quadrant, a lower quadrant
- 718 Fourth quadrant, a lower quadrant,
- 722 First electromagnet of the first quadrant
- 724 Second electromagnet of the first quadrant
- 725 Power amplifier for the first and second electromagnet of the first quadrant
- 742 First electromagnet of the second quadrant
- 744 Second electromagnet of the second quadrant
- 745 Power amplifier for the first and second electromagnet of the second quadrant FIG. 8 illustrates an example of the invention by a cross section of a third embodiment of a radial magnetic bearing according to the invention, across its rotor:
- 822 First electromagnet of the first quadrant
- 824 Second electromagnet of the first quadrant
- 825 Power amplifier for the second electromagnet of the first quadrant
- 842 First electromagnet of the second quadrant
- 844 Second electromagnet of the second quadrant
- 845 Power amplifier for the first electromagnet of the second quadrant 865 Power amplifier for the second electromagnet of the second quadrant 885 Power amplifier for the first electromagnet of the first quadrant.

What is claimed is:

1. A radial magnetic bearing comprising:
a rotor configured to rotate around an axis of rotation,
a stator,
wherein the bearing is divided into four quadrants, a first upper quadrant and a second upper quadrant located above the axis of rotation of the rotor in a direction that is opposite to a direction of gravity when in use and a first lower quadrant and a second lower quadrant located below the axis of rotation of the rotor in the direction of gravity towards the earth when in use, a longitudinal axis of the rotor being along the axis of rotation and substantially perpendicular to the direction of gravity when in use,
the stator comprising a first plurality of electromagnets in the first and second upper quadrants, the first plurality of electromagnets in the first and second upper quadrants having an upper joint stator electromagnetic force capacity larger than the gravitational force on the rotor,
wherein a lower joint stator electromagnetic force capacity of the two lower quadrants is approximately or equal to 30% of the upper joint stator electromagnetic force capacity in the two upper quadrants,
wherein an area of the stator used by a second plurality of electromagnets in the first and second lower quadrants plus an available area along the stator without electromagnets in the first and second lower quadrants is substantially the same size as an area of the stator used by the first plurality of electromagnets in the first and second upper quadrants plus a second available area along the stator without electromagnets in the first and second upper quadrants, the lower joint stator electromagnetic force capacity that is added to the gravitational force acting on the rotor such that the magnitude of the vector sum of the gravitational force and the lower joint stator electromagnetic force capacity equals the magnitude of the upper joint stator electromagnetic force capacity,
wherein each the first and second plurality of electromagnets are configured to only be connectable via wire directly to another one of the first and second plurality of electromagnets if they are located in a same one of the four quadrants.

2. The radial magnetic bearing according to claim 1, wherein the magnitude of the upper joint stator electromagnetic force capacity is greater than the magnitude of the vector sum of the lower joint stator electromagnetic force capacity and the gravitational force.

3. The radial magnetic bearing according to claim 1, wherein the stator comprises the second plurality of electromagnets in the first and second lower quadrants, and the lower joint stator electromagnetic force capacity is less than 50% of the upper joint stator electromagnetic force capacity.

4. The radial magnetic bearing according to claim 3, wherein the joint stator capacity in the two lower quadrants due to the electromagnets equals approximately 30% of the joint stator capacity in the two upper quadrants due to electromagnets.

5. The radial magnetic bearing according to claim 1, wherein at least one of the first and second upper quadrants further comprises at least two independent circuits of electromagnets,
wherein each of the independent circuits are fed by an individual current power amplifier,
wherein the individual power amplifiers deliver the same current for each of the independent circuits of electromagnets within a same quadrant.

6. The radial magnetic bearing according to claim 5, wherein the first and second upper quadrants further comprising two or more power amplifiers per quadrant, each power amplifier feeding one independent circuit of electromagnets, thereby decreasing the inductance seen by each power amplifier to increase at least one of (a) a dynamic capability and (b) a power amplifier failure tolerance of the bearing.

7. The radial magnetic bearing according to claim 1, wherein the available area in the first and second lower quadrants is at least in part used for instrumentation.

8. The radial magnetic bearing according to claim 7, the instrumentation further comprising at least one of:
(a) a position sensor,
(b) a vibration sensor,
(c) a rotor temperature sensor, and
(d) a speed sensor.

9. The radial magnetic bearing according to claim 1, wherein the available area in the first and second lower quadrants is at least in part used to place at least one auxiliary landing bearing.

10. The radial magnetic bearing according to claim 1, wherein the available area in the first and second lower quadrants is at least in part used to place a mechanical support in case of failure of the magnetic bearing.

11. The radial magnetic bearing according to claim 1, wherein the available area in the first and second lower quadrants is at least in part used to place a cooling system for the rotor.

12. A radial magnetic bearing comprising:
a rotor configured to rotate around an axis of rotation;
a stator,
wherein the bearing is divided into four quadrants, a first upper quadrant and a second upper quadrant located above the axis of rotation of the rotor in a direction that is opposite to a direction of gravity when in use and a first lower quadrant and a second lower quadrant located below the axis of rotation of the rotor in the direction of gravity towards the earth when in use, a longitudinal axis of the rotor being along the axis of rotation and substantially perpendicular to the direction of gravity when in use,
the stator comprising a first plurality of electromagnets in the first and second upper quadrants, the first plurality of electromagnets in the first and second upper quadrants having an upper joint stator electromagnetic force capacity larger than the gravitational force on the rotor,
wherein the entire area of the first and second lower quadrants is made available for other non-stator components because no electromagnets are present in the first and second lower quadrants such that the gravitational force acting on the rotor is the only force present other than the upper joint stator electromagnetic force capacity.

* * * * *